United States Patent
Dobrinsky et al.

(10) Patent No.: US 10,548,332 B2
(45) Date of Patent: Feb. 4, 2020

(54) DISINFECTION OF GRAIN USING ULTRAVIOLET RADIATION

(71) Applicant: Sensor Electronic Technology, Inc., Columbia, SC (US)

(72) Inventors: Alexander Dobrinsky, Loudonville, NY (US); Michael Shur, Latham, NY (US)

(73) Assignee: Sensor Electronic Technology, Inc., Columbia, SC (US)

( * ) Notice: Subject to any disclaimer, the term of this patent is extended or adjusted under 35 U.S.C. 154(b) by 212 days.

(21) Appl. No.: 15/444,785

(22) Filed: Feb. 28, 2017

(65) Prior Publication Data

US 2017/0245527 A1    Aug. 31, 2017

Related U.S. Application Data

(60) Provisional application No. 62/301,021, filed on Feb. 29, 2016.

(51) Int. Cl.
| | |
|---|---|
| *A23B 9/06* | (2006.01) |
| *A23L 3/28* | (2006.01) |
| *A23L 3/26* | (2006.01) |

(52) U.S. Cl.
CPC ....... *A23B 9/06* (2013.01); *A23L 3/28* (2013.01); *A23L 3/26* (2013.01)

(58) Field of Classification Search
CPC .... C02F 1/30; C02F 1/32; C02F 1/325; C02F 1/001; A47J 37/044; A47J 37/045; A23B 9/06; A23L 3/28; A23L 3/26
USPC .......... 99/451, 452, 453, 477, 358; 210/188, 210/202, 192, 259
See application file for complete search history.

(56) References Cited

U.S. PATENT DOCUMENTS

| | | | | |
|---|---|---|---|---|
| 5,699,724 | A | * 12/1997 | Wettstein | B07C 5/3425 241/14 |
| 6,264,836 | B1 | * 7/2001 | Lantis | C02F 1/325 210/188 |
| 7,553,456 | B2 | 6/2009 | Gaska et al. | |
| 7,634,996 | B2 | 12/2009 | Gaska et al. | |
| 8,277,734 | B2 | 10/2012 | Koudymov et al. | |
| 8,980,178 | B2 | 3/2015 | Gaska et al. | |
| 9,006,680 | B2 | 4/2015 | Bettles et al. | |
| 9,061,082 | B2 | 6/2015 | Gaska et al. | |
| 9,138,499 | B2 | 9/2015 | Bettles et al. | |
| 9,179,703 | B2 | 11/2015 | Shur et al. | |

(Continued)

OTHER PUBLICATIONS

Faruki, et al., "Effects of ultraviolet (254nm) irradiation on egg hatching and adult emergence of the flour beetles, Tribolium castaneum, T. confusum and the almond moth, Cadra cautella," Journal of Insect Science, May 29, 2007, 6 pages.

(Continued)

*Primary Examiner* — Reginald Alexander
(74) *Attorney, Agent, or Firm* — LaBatt, LLC

(57) ABSTRACT

A system for irradiation of grain foods using one or more ultraviolet emitting sources is provided. The system includes an irradiation region in which the grain foods are irradiated by ultraviolet light. The system can include means for moving the grain foods through irradiation region, means for detecting the flow rate of the grain foods moving through irradiation region, and a control system for adjusting power provided to the ultraviolet emitting sources based on the flow rate of the grain foods.

20 Claims, 6 Drawing Sheets

(56) References Cited

U.S. PATENT DOCUMENTS

| | | | |
|---|---|---|---|
| 9,572,903 B2 | 2/2017 | Dobrinsky et al. | |
| 9,603,960 B2 | 3/2017 | Dobrinsky et al. | |
| 9,687,577 B2 | 6/2017 | Dobrinsky et al. | |
| 9,718,706 B2 | 8/2017 | Smetona et al. | |
| 10,099,944 B2 | 10/2018 | Smetona et al. | |
| 2007/0108056 A1* | 5/2007 | Nyberg | B01D 61/44 204/554 |
| 2010/0183779 A1* | 7/2010 | Felix | A23B 7/015 426/231 |
| 2013/0048545 A1 | 2/2013 | Shatalov et al. | |
| 2014/0060094 A1 | 3/2014 | Shur et al. | |
| 2014/0060095 A1 | 3/2014 | Shur et al. | |
| 2014/0060096 A1 | 3/2014 | Shur et al. | |
| 2014/0060104 A1 | 3/2014 | Shur et al. | |
| 2014/0202962 A1 | 7/2014 | Bilenko et al. | |
| 2015/0008167 A1 | 1/2015 | Shturm et al. | |
| 2015/0069270 A1 | 3/2015 | Shur et al. | |
| 2015/0165079 A1 | 6/2015 | Shur et al. | |
| 2015/0217011 A1 | 8/2015 | Bettles et al. | |
| 2015/0297767 A1 | 10/2015 | Gaska et al. | |
| 2015/0336810 A1 | 11/2015 | Smetona et al. | |
| 2016/0000953 A1 | 1/2016 | Bettles et al. | |
| 2016/0058020 A1 | 3/2016 | Shur et al. | |
| 2016/0114186 A1 | 4/2016 | Dobrinsky et al. | |
| 2016/0128526 A1 | 5/2016 | Dobrinsky et al. | |
| 2016/0324996 A1 | 11/2016 | Bilenko et al. | |
| 2017/0057842 A1 | 3/2017 | Dobrinsky et al. | |
| 2017/0100494 A1 | 4/2017 | Dobrinsky et al. | |
| 2017/0100495 A1 | 4/2017 | Shur et al. | |
| 2017/0100496 A1 | 4/2017 | Shur et al. | |
| 2017/0157276 A1 | 6/2017 | Dobrinsky et al. | |
| 2017/0189711 A1 | 7/2017 | Shur et al. | |
| 2017/0245616 A1 | 8/2017 | Lakios et al. | |

OTHER PUBLICATIONS

North Carolina State University, "New elastic material changes color in UV light," ScienceDaily, Apr. 16, 2011, 4 pages.

Calado, et al. "Irradiation for Mold and Mycotoxin Control: A Review," Comprehensive Reviews in Food Science and Food Safety, 2014, 13 pages, vol. 13, Institute of Food Technologists.

* cited by examiner

DISINFECTION OF GRAIN USING ULTRAVIOLET RADIATION

REFERENCE TO RELATED APPLICATIONS

The current application claims the benefit of U.S. Provisional Application No. 62/301,021 which was filed on 29 Feb. 2016, and which is hereby incorporated by reference.

TECHNICAL FIELD

The disclosure relates generally to ultraviolet irradiation of objects, and more particularly, to disinfection of grain food using ultraviolet light.

BACKGROUND ART

Ultraviolet (UV) germicidal irradiation has been applied to the sterilization of agricultural products including stored grain for foodstuffs or animal feed. Ultraviolet radiation can eliminate fungi and mold which are responsible for the deterioration of agricultural products and foods such as grain foods. Such fungi may be responsible for the decay of commodities at a pre-harvest level and also be responsible for the deterioration of fresh and processed foods, causing their rejection due to the visible development of molds on these foods. In addition, some specific fungal species growing on agricultural commodities may produce mycotoxins. Mycotoxins are a hidden aspect of mold contamination because they remain on or in products well beyond the life cycle of the fungi. Moreover, mycotoxins are extremely stable and moderately heat-resistant compounds that remain almost intact after food processing.

UV treatment is known to be effective for killing pathogenic molds that contaminate the surface of grain. It was also found that such irradiation is able to eliminate mycotoxins, the fungal metabolites that have adverse effects on human and animal health.

SUMMARY OF THE INVENTION

Aspects of the invention provide a system for irradiation of grain foods with ultraviolet radiation. The system can include an intake section for the grain foods, which is followed by an irradiation region containing a set of UV sources for irradiation of the grain foods, which can be followed by a grain foods dispensing section. In some embodiments, the irradiation region can serve as the grain foods dispensing section. The set of UV sources can have UV emitters that emit ultraviolet radiation having several distinct peak wavelengths. The system can comprise a user input system, which can enable the user to select the grain foods flow rate as well as describe one or more of the grain foods physical parameters such as size, shape, and color of the grain. Further, the system can comprise a feedback system that adjusts one or more aspects of the emitted ultraviolet radiation such as power, wavelength, or angular distribution, based on the grain foods flow rate and/or the user inputs.

A first aspect of the invention provides a system for irradiation of grain foods, the system comprising: an irradiation region for exposing grain foods to ultraviolet light, wherein the irradiation region includes a set of UV emitters positioned to irradiate the grain foods as the grain foods pass there through with UV radiation; means for moving the grain foods through the irradiation region; means for detecting a flow rate of the grain foods moving through the irradiation region; and a control system for adjusting power provided to the set of UV emitters based on the flow rate of the grain foods moving through the irradiation region.

A second aspect of the invention provides a system for irradiation of grain foods, the system comprising: an ultraviolet irradiation region for exposing grain foods to ultraviolet light, wherein the irradiation region includes a plurality of UV light emitting diodes positioned to irradiate grain foods with the ultraviolet light as the grain foods pass through the irradiation region, wherein the plurality of UV light emitting diodes includes at least two UV light emitting diodes with peak wavelengths that differ by at least 10 nm; means for moving the grain foods through the irradiation region; means for detecting a flow rate of the grain foods moving through the irradiation region; and a control system for adjusting power provided to the plurality of UV light emitting diodes based on the flow rate of the grain foods moving through the irradiation system.

A third aspect of the invention provides a system for irradiation of grain foods, the system comprising: an ultraviolet irradiation region for exposing the grain foods to ultraviolet light, with the irradiation region having a set of UV emitters positioned to irradiate the grain foods as the grain foods pass through the irradiation region; means for moving the grain foods through the irradiation region; means for detecting a flow rate of the grain foods moving through the irradiation region; an auxiliary light emitting source for testing grain fluorescence; a fluorescence sensor for detecting a fluorescent signal from the grain foods irradiated by the auxiliary light emitting source; and a control system for adjusting power provided to the set of UV emitters based on the flow rate of the grain foods moving through the irradiation system and an intensity of the fluorescent signal measured by the fluorescence sensor.

The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1A:
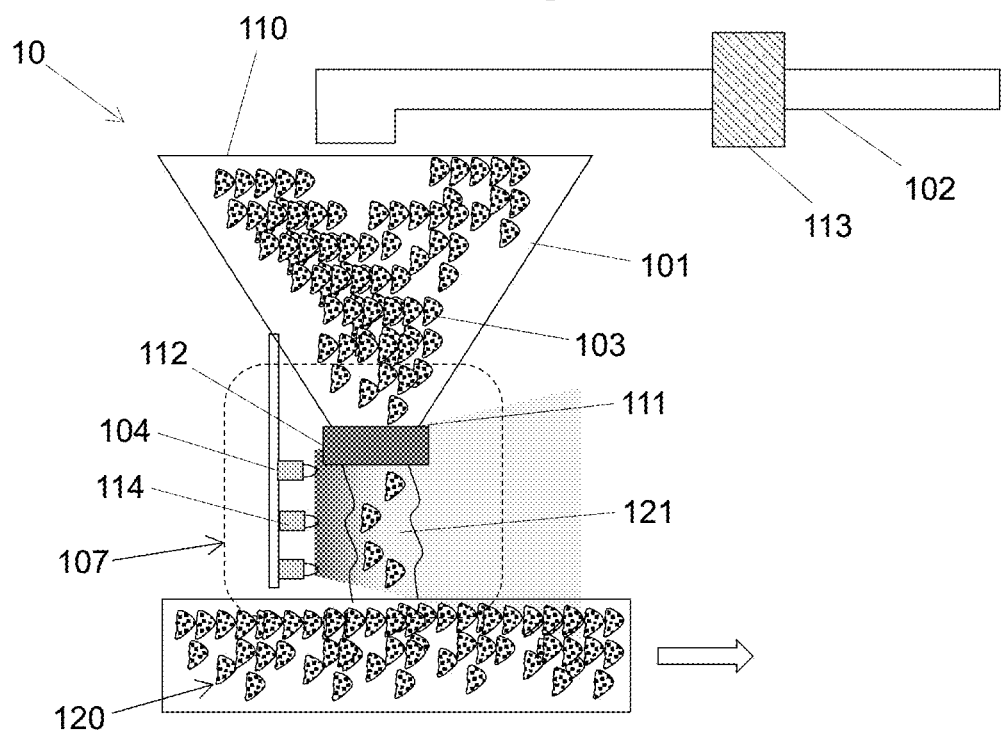
FIGS. 1A and 1B show a schematic of an illustrative embodiment of the invention.

As indicated above, aspects of the invention provide a system for irradiation of grain foods with ultraviolet radiation. The system can include an intake section for grain foods, which is followed by an irradiation region containing a set of UV sources for irradiation of grain foods, which can be followed by a grain foods dispensing section. In some embodiments, the irradiation region can serve as the grain foods dispensing section. The set of UV sources can have UV emitters that emit ultraviolet radiation having several distinct peak wavelengths. The system can comprise a user input system, which can enable the user to select grain flow rate as well as describe one or more of grain foods physical parameters such as size, shape, and color of the grain. Further, the system can comprise a feedback system that adjusts one or more aspects of the emitted ultraviolet radiation such as power, wavelength, or angular distribution, based on the grain flow rate and/or user inputs.

As used herein, unless otherwise noted, the term "set" means one or more (i.e., at least one) and the phrase "any solution" means any now known or later developed solution. It is understood that, unless otherwise specified, each value is approximate and each range of values included herein is inclusive of the end values defining the range. As used herein, unless otherwise noted, the term "approximately" is inclusive of values within +/−ten percent of the stated value, while the term "substantially" is inclusive of values within +/−five percent of the stated value. Unless otherwise stated, two values are "similar" when the smaller value is within +/−twenty-five percent of the larger value. A value, y, is on the order of a stated value, x, when the value y satisfies the formula $0.1x \leq y \leq 10x$.

As also used herein, a layer is a transparent layer (or at least partially transparent layer) when the layer allows at least five percent of radiation having a target wavelength, which is radiated at a normal incidence to an interface of the layer, to pass there through. Furthermore, as used herein, a layer is a reflective layer (or an at least partially reflective layer) when the layer reflects at least five percent of radiation having a target wavelength, which is radiated at a normal incidence to an interface of the layer. In an embodiment, the target wavelength of the radiation corresponds to a wavelength of radiation emitted or sensed (e.g., peak wavelength +/−five nanometers) by an active region of an optoelectronic device during operation of the device. For a given layer, the wavelength can be measured in a material of consideration and can depend on a refractive index of the material.

The system for irradiation of grain foods includes a set of UV sources that can comprise one or more UV light emitting diodes (UV LEDs). The UV LED(s) can emit ultraviolet radiation having a peak wavelength ranging from 230-360 nm, and in a more particular embodiment, the UV LEDs emit ultraviolet radiation in the range of 250-310 nm. It is understood that UV LEDs can be combined with other ultraviolet light emitting sources such as mercury lamps. It is further understood that the set of UV LEDs can deliver radiation at a plurality of different peak wavelengths. The UV LEDs can be encapsulated by a UV transparent material, such as a fluoropolymer, to isolate light emitting components from the region containing grain foods.

The UV radiation sources can be located within an irradiation region of the system, which can comprise an enclosure with means of moving grain foods through the enclosure. In an embodiment the enclosure can include a conveyer belt for transporting the grain foods through the irradiation region. In an embodiment, the grain foods are dispensed over the conveyer belt to form a thin layer capable of being thoroughly irradiated by UV radiation. The thin grain layer can comprise a single grain layer or a layer having at most 10 grain layers. The conveyer belt can comprise a mesh or screen with openings having a diameter smaller than the characteristic grain diameter of a typical grain within the grain foods. In an embodiment, the conveyer belt can comprise a partially UV transparent belt or a belt having UV reflective sections. A partially UV transparent material can comprise a fluoropolymer, while a UV reflective material can comprise an expanding polytetrafluoroethylene (ePTFE) membrane (e.g., GORE® DRP® Diffuse Reflector Material), PTFE, polished aluminum, and/or the like. An alternative means for moving the grains through the irradiation region can be the force of gravity.

Figure 1B:
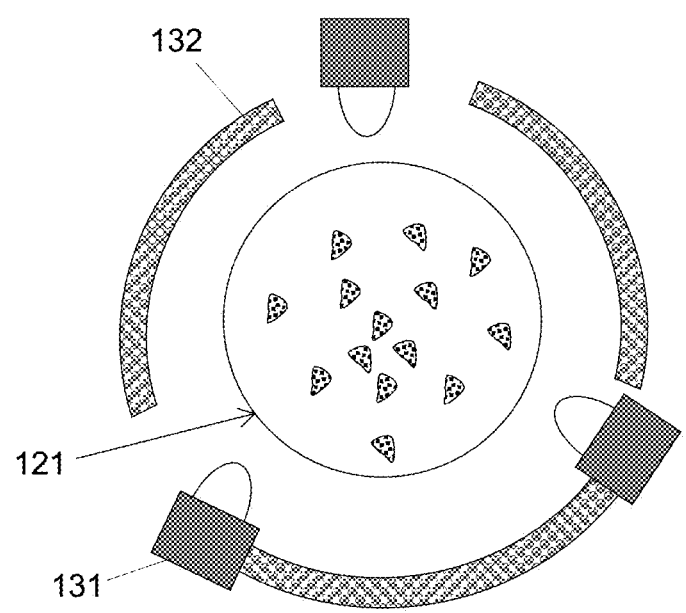

Turning to the drawings, FIGS. 1A and 1B show an illustrative embodiment of a system 10 in which gravity is used to transport grain foods through an irradiation region 107. In this case, the system 10 includes an intake section 101 with the grain foods 103 entering the intake section 101 at a first side 110 through a feeding unit 102. The intake section 101 can comprise, for example, a funnel with the grain foods exiting a second side 111 of the funnel. As the grain foods travel between the second side 111 and a grain dispensing container 120 they can be irradiated by an ultraviolet radiation unit 104. In an embodiment, the ultraviolet radiation unit 104 contains multiple UV LEDs 114.

For more effective irradiation, the UV radiation can be delivered at multiple angles to the stream of grains 121 exiting the intake section 101. FIG. 1B shows a top cross-sectional view of the stream of the grain foods 121 with UV LEDs 131 positioned at multiple angles around the stream of grains 121. Furthermore, mirrors 132 can be also positioned around the stream of grains 121 to recycle the UV radiation emitted by the UV LEDs 131. In an embodiment, the mirrors can comprise UV diffusively reflective material such as rough aluminum, PTFE (e.g., Teflon®), ePTFE (e.g., GORE® DRP® Diffuse Reflector Material), omnidirectional mirrors comprising dielectric (e.g., $SiO_2$, $Al_2O_3$, etc.) and metallic layers, and/or the like.

In addition, the system 10 for irradiation of grain foods can include means for detecting a flow rate of the grain foods moving through the irradiation region. For instance, the system 10 can incorporate a solid mass flow meter 112. The flow meter 112 can be positioned adjacent to the intake second side 111 as shown in FIG. 1A.

In an embodiment, the system 10 for irradiation of grain foods includes a control system for adjusting power provided to the UV emitters 114, e.g., based on the flow rate of the grain foods moving through the irradiation region 107. In an embodiment, the control system can further control a valve 113 which can be located, as an example, in feeding unit 102, in order to adjust the flow rate of the grain foods.

Other components of the irradiation system 10 can include a user input system, which enables a user to select grain flow rate, describe one or more physical parameters of the grain foods, such as size, shape, color, and/or the like, of the grain foods. For instance, the user input system can present the user with a menu of available shapes, from which a grain shape can be selected.

Figure 2:
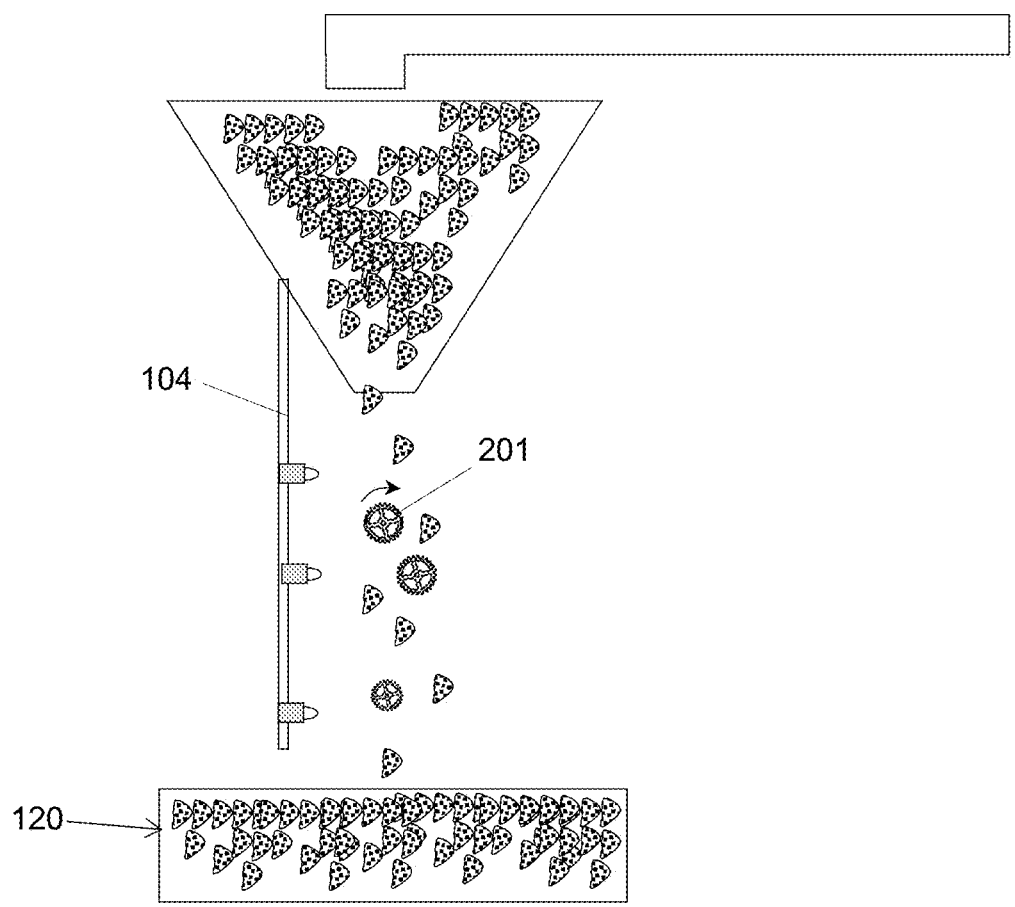
FIG. 2 shows a variation of an illustrative embodiment of the invention.

FIG. 2 shows an illustrative embodiment of the system in which the irradiation region further includes a mixing and tumbling device 201 designed to induce rotation and overall motion of the grain foods around their centers of mass during ultraviolet irradiation. The tumbling system can comprise, for example, one or more elements 201 positioned within the stream of the grain foods designed to interfere with the grain foods motion. In an embodiment, such elements can comprise UV reflective mirrors and or other surfaces oriented to allow the grain foods to bounce off such surfaces and continue to move (e.g., free fall) towards the dispensing section 120. In this case, such UV reflective mirrors can comprise aluminum or fluoropolymer surfaces.

Figure 3A:
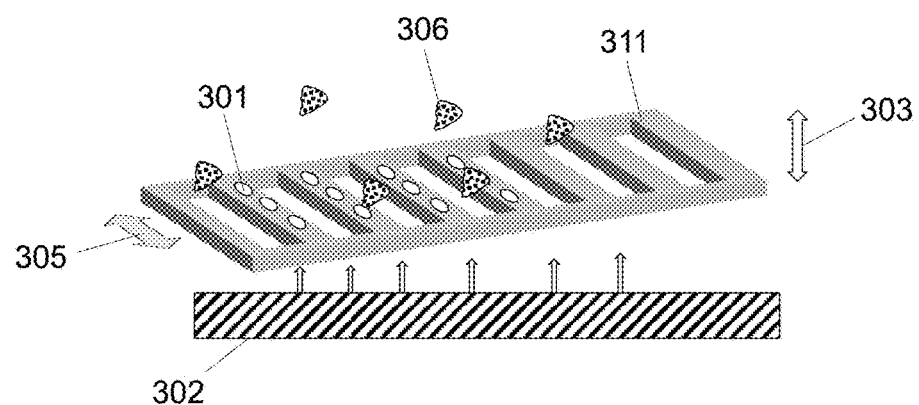
FIGS. 3A and 3B show an illustrative embodiment of the invention utilizing a screen and gas for suspending the grain particles.

FIG. 3A shows an illustrative embodiment where the grains 306 are transported over a screen or a mesh 311 through an irradiation region. The mesh 311 can contain a set of UV LED sources 301, which can comprise one or more UV LEDs. As illustrated, the mesh 311 can undergo lateral 305 and/or vertical 303 vibration for tumbling and rotating the grain foods as they are being radiated with the UV light emitted by the UV LED sources 301. The mesh 311 can be oriented along a direction of the grain foods flow, or it can be installed perpendicular to the flow. The mesh 311 can serve any combination of several functions. For example, the mesh 311 can comprise a barrier to the grain flow with vibration of the mesh affecting the flow speed. The mesh 311 also can provide filtering functions, e.g., by removing debris or large grains contained in a grain food. Furthermore, the mesh 311 can providing multiple surfaces that can serve as reflective surfaces for UV radiation. To this extent, a surface of the mesh 311 can comprise polished aluminum, PTFE, ePTFE, or the like. Additionally, a surface of the mesh 311 can be covered with a photo-catalyst, such as $TiO_2$, for improving disinfection of the grain foods. Furthermore, the mesh 311 can be combined with a gas directing element 302, such as a fan, that can levitate the grain foods above the mesh 311 and further induce rotation and motion of the grin foods.

Figure 3B:
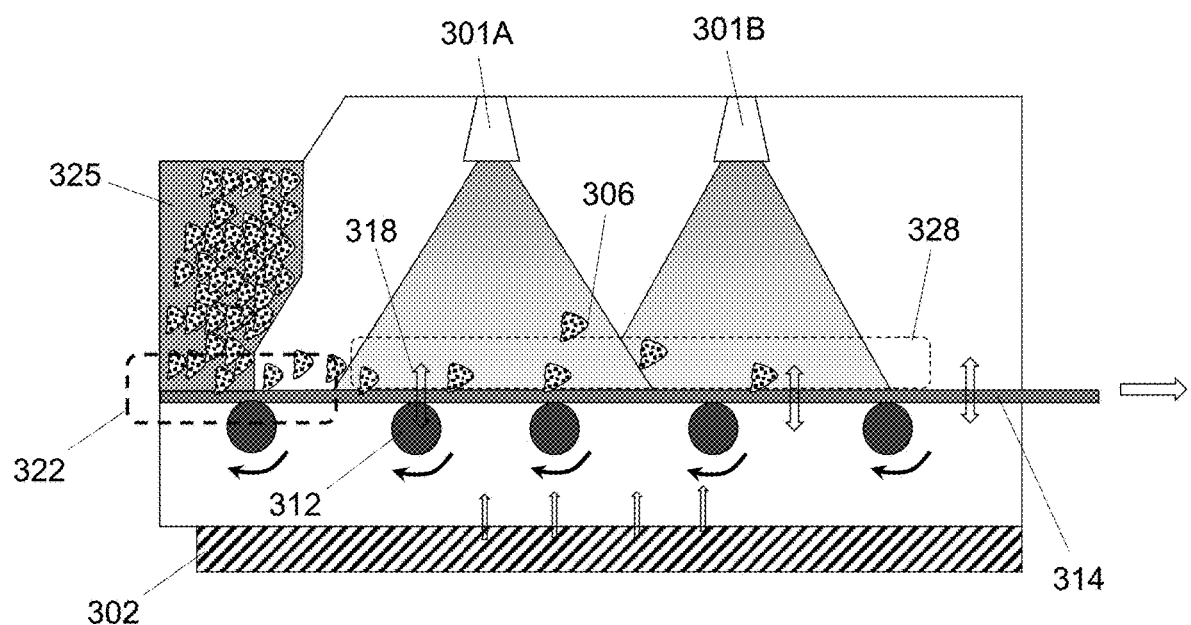

FIG. 3B illustrates an alternative design wherein the grains 306 are transported on a conveyer belt 314 moved by rollers 312. In an embodiment, the conveyer belt 314 comprises a mesh that has openings smaller than the grain characteristic size with the mesh capable of vertical and/or horizontal vibration as described in conjunction with FIG. 3A. The grain foods can be illuminated by UV sources 301A and 301B located apart from the conveyer belt 314. The UV sources 301A, 301B can be designed to deliver uniform radiation over an area of the conveyer belt 314. In general, the intensity of UV radiation and/or the spatial distribution of intensity emitted over the conveyer belt can be selected to deliver a selected dose of UV radiation for the disinfection of the grain foods. For thorough irradiation, the grain foods can be further tumbled using, for example, gas emitted by a gas directing element 302. FIG. 3B also illustrates an intake area 325 and a region 322 that can serve as a gap with a controllable cross-sectional height allowing the grain foods to spread into a thin layer 328 having thickness of at most 10 grains.

Figure 4:
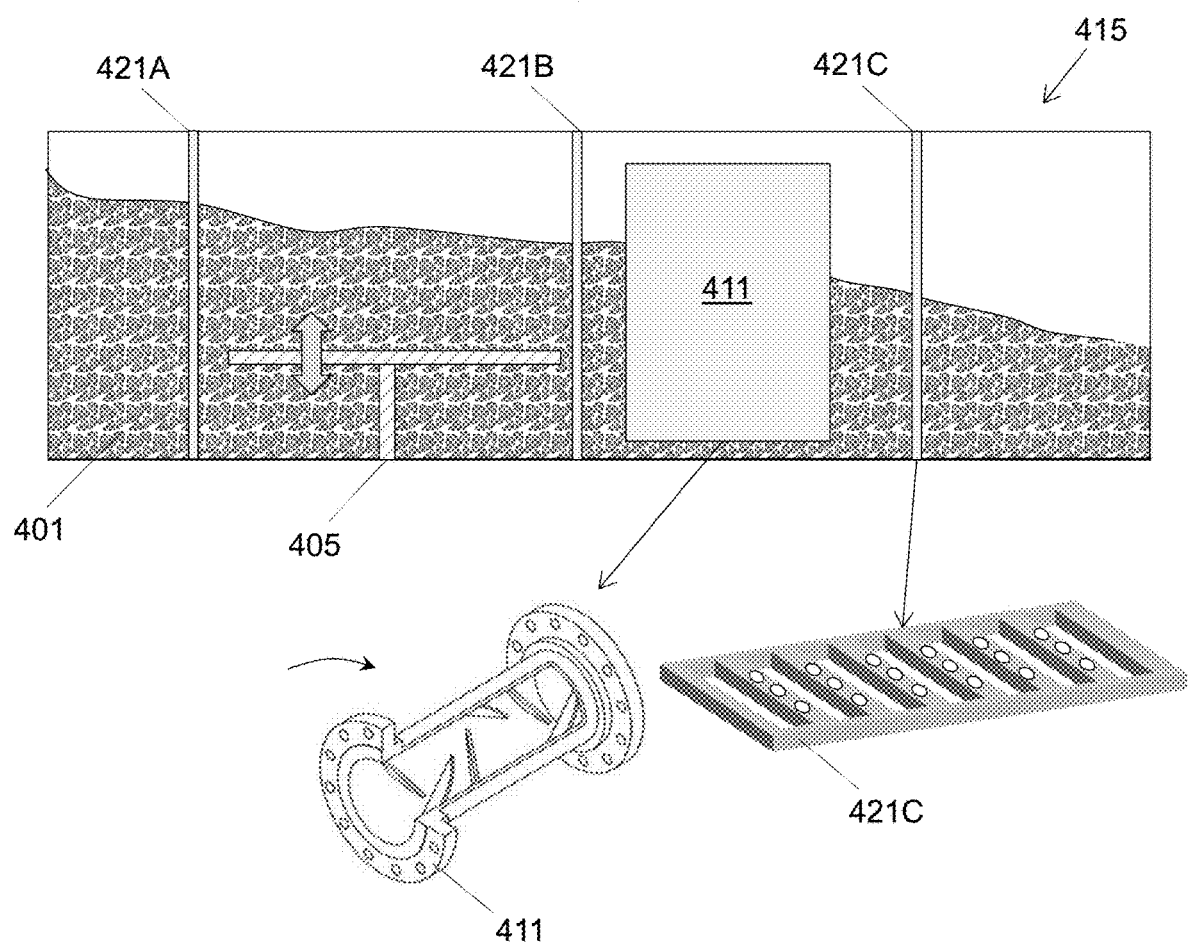
FIG. 4 shows an illustrative embodiment of the invention utilizing mixing methods for grain.

FIG. 4 shows another embodiment of the invention in which the grain foods are transported and disinfected within a cylindrical enclosure 415. In this case, the cylindrical enclosure 415 can contain a vibrating element 405, and a set of screen elements 421A-421C. As illustrated, each screen element 421A-421C can include UV LEDs embedded therein. In addition, another mixing element can comprise a system 411 that contains static or rotating blade elements.

The dimensions of the cylindrical enclosure, the intensity of UV light, and/or the operation of elements 421A-421C as well as 405 and 411, can be adjusted for grain foods to acquire a target dose of UV radiation while present within the enclosure 415. The dose of the UV radiation can be inferred through the use of specific tests with test grains that are specifically designed to change color when exposed to UV radiation. For example, the test grains can be manufactured from elastic gel containing spiropyran—a photochromic compound that change color under UV radiation. In an embodiment, the UV activated pigments, such as spiropyran and similar ones known in the art, can be deposited over a set of test grains that are used for system calibration. The modified grains can be propagated through the irradiation system, and changes in color can be recorded. Based on the coloring of the test grains, one or more of the system parameters can be adjusted, and the process of irradiation can be tested again with a new batch of the test grains. The process can be repeated until an acceptable coloring of the grains is attained through the changes in parameters such as changing the grain flow rate, the vibrational characteristics of multiple sift systems, and changes in the rotational characteristics of the mixing elements.

Figure 5:
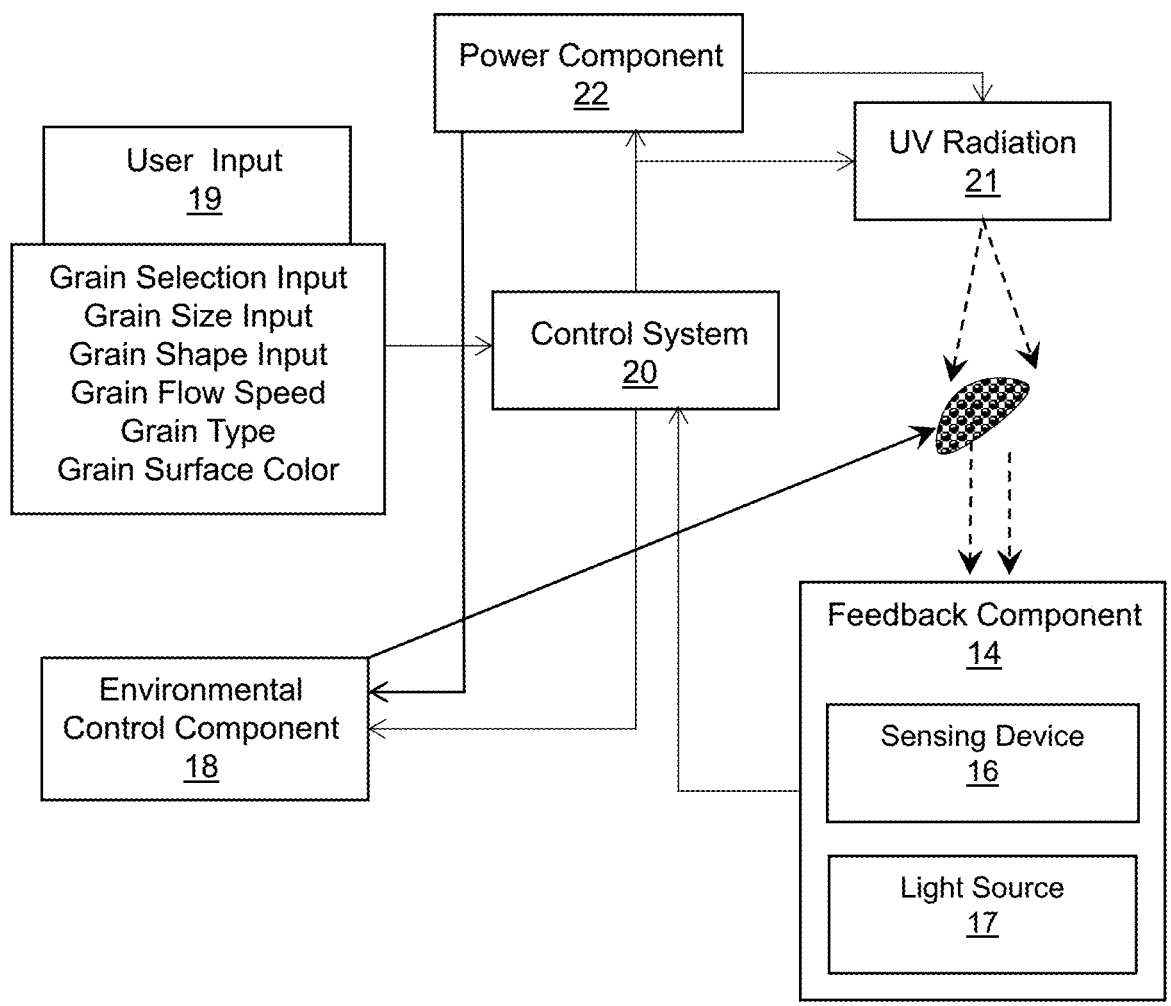
FIG. 5 shows an illustrative flowchart for controlling the disinfection process according to an embodiment.

FIG. 5 shows an illustrative flow diagram used for disinfection of the grain foods according to an embodiment. An embodiment of the irradiation system illustrated in the flow diagram contains a UV radiation source 21 located within an irradiation chamber, which can be powered by a power component 22. An environmental control component 18 can control one or more aspects of the grain foods transport, such as the grain foods flow rate, vibration of various surfaces within the irradiation chamber, as well as the rotational rates and directions of the mixing elements located within the chamber. In an embodiment, the environmental control component 18 can control the use of a gas, such as air, for levitation of grain foods. Furthermore, the environmental control component 18 can modify other aspects of the grain environment, such as humidity, or a presence of chemical substance(s) and/or gas(es) for the grain foods disinfection. All aspects of the environmental control component 18 can be powered by the power component 22.

In addition, the irradiation system can contain a user input component 19 that can allow a user to select a type of a grain that needs to be irradiated. The selection process can comprise, for example, a software system containing a database of grains, from which the user can make a selection. The software system can be accessed through any combination of usual computer means including a computer terminal and keyboard, a touch screen or a remote system, such as smart telephone, for example. A control system 20 (e.g., a programmed general purpose computing device) of an irradiation system can interact with a remote user input system, with some of the functionality of the control system 20 can be located in a physically disjoined device, such as smart phone for example. The user can select either the type of grain food being disinfected or can create a generic disinfection profile for a grain food by selecting one or more of the size of the grain, the shape of the grain, and grain surface color.

The grain foods can be further analyzed by a control system 20 through the optical recognition, and through analyzing reflecting properties of the grain foods to UV radiation. In such a case, prior to operating a device, the device can comprise an analysis chamber capable of analyzing different properties of the grain foods. For instance, the user can place a representative grain into such an analysis chamber, prior to operating the device, and the system can record the grain characteristics into its database. Several different grains can be placed in the analysis chamber in order for the system to record statistical properties of the grains that are used for disinfection. The analyzing module can be used for detection of grain weight, size and shape as well as grain optical reflectance to ultraviolet radiation. The analyzing module can comprise an optical scanner or a camera for inferring information about the grain shape and size, and correlating the information with the weight measurement of a grain and the type of grain (e.g., grain density). The user input component 19 can further enable the user to control the grain foods flow rate.

The control system 20 can receive user inputs from the user input 19 and adjust the power provided to the UV radiation component 21 as well as power provided to the environmental control component 18. For example, the control system 20 can configure the UV radiation component 21 wavelength and radiation characteristics by adjusting the power provided thereto.

An embodiment of the irradiation system illustrated in the flow diagram of FIG. 5 can contain a feedback component 14 that can comprise a set of sensors for measuring fluorescence from the surface of the grain foods. In an embodiment, the feedback component 14 can include a light source 17 for excitation of fluorescent radiation and a sensing device 16 for measuring the fluorescent radiation. The sensing device can comprise a camera, as an example. The feedback component 14 can communicate fluorescent data to the control system 20 which can contain a necessary logic for adjusting the power provided to the UV radiation component 21 and to the environmental control component 18. For instance, a large fluorescence signal emitted from the grain foods can require the control system 20 to increase the power of UV radiation component. It is understood that in addition to monitoring and controlling the power provided to the UV radiation component 21, other aspects of the disinfection system can be controlled, such as the flow rate of the grain, the vibrational amplitude and/or frequency of various screens used to sift the grain, application and/or flow of gas over the grain foods, a location of one screen relative to another screen (e.g., the screens can move relative one another, and vibrate relative to one another, resulting in complex turbulent motion of grain foods within the irradiation system), and/or the like.

Figure 6:
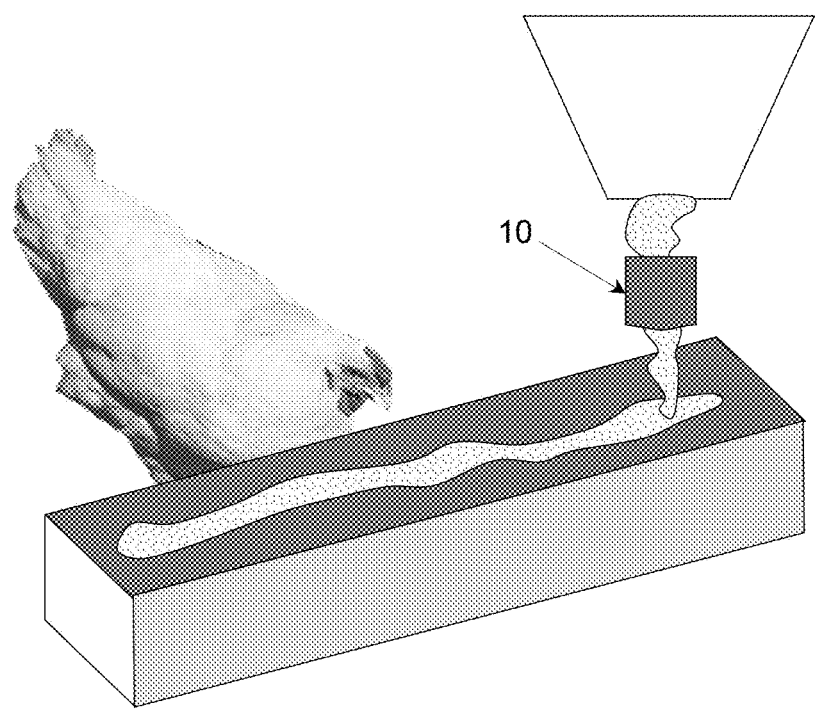
FIG. 6 shows an illustrative farm feeding system including a disinfection system described herein according to an embodiment.

An embodiment of an irradiation system described herein can be installed in places where the grain foods are used for feeding farm animals. An example of such a system is shown in FIG. 6, where the grain foods are disinfected using an irradiation system 10 prior to feeding chicken. Alternative applications of the irradiation system can include: irradiating rice, beans, corn, and/or the like. It is understood that the irradiation system can be utilized in conjunction with the irradiation of foods intended for human or animal consumption. It is understood that high intensity UV-C radiation can also be used for destroying small insects and insect eggs which may be present within the grain foods. For instance, an irradiation system described herein can include a 15 W UV-C germicidal lamp emitting at wavelength of approximately 254 nm, which can successfully reduce the hatching of eggs after a 24 min exposure.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A system for irradiation of grain foods, the system comprising:
    an irradiation region for exposing grain foods to ultraviolet light; wherein the irradiation region includes a set of UV emitters positioned to irradiate the grain foods as the grain foods pass there through with UV radiation;
    means for moving the grain foods through the irradiation region;
    means for detecting a flow rate of the grain foods moving through the irradiation region;
    a control system for adjusting power provided to the set of UV emitters based on the flow rate of the grain foods moving through the irradiation region; and
    an analyzing module configured to analyze a grain optical reflectance under ultraviolet radiation.

2. The system of claim 1, wherein the means for moving the grain foods uses the force of gravity.

3. The system of claim 1, wherein the means of moving the grain foods uses at least one conveyer belt.

4. The system of claim 1, wherein the means for detecting the flow rate of the grain foods comprises a solid mass flow meter positioned prior to the irradiation region.

5. The system of claim 1, further comprising a user input system for enabling a user to selectively adjust a set of control parameters, the set of control parameters comprising: the flow rate of the grain foods, a typical size of a grain, a typical shape of the grain, and a color of the grain, wherein the user input system enables selection of the typical shape from a menu of available shapes.

6. The system of claim 1, wherein the analyzing module is physically separate from the irradiation region.

7. The system of claim 1, further comprising an analyzing module for automatically determining a grain characteristic shape and a grain characteristic size.

8. The system of claim 1, wherein the irradiation region further includes a mixing and tumbling device configured to induce rotation and overall motion of the grain foods during ultraviolet radiation irradiation of the grain foods.

9. The system of claim 1, further comprising a gate located upstream of the irradiation region, wherein the gate comprises a gap with a controllable cross-sectional height causing the grain foods to spread into a thin layer having thickness of at most 10 grain diameters.

10. The system of claim 9, wherein the set of UV emitters are positioned to produce radiation that is substantially normal to a surface of a supporting structure of the thin layer.

11. The system of claim 1, wherein the irradiation region comprises a region of a free falling stream of grain foods, wherein the set of UV emitters emit ultraviolet light directed at the free falling stream positioned to deliver a target intensity distribution of UV radiation around the free falling stream, wherein the target intensity distribution of UV radiation varies by less than 50% from a maximum intensity value to a minimum intensity value around the free falling stream at a given stream cross-section.

12. The system of claim 1, wherein the UV radiation is in the UVC range of 210 nm to 290 nm.

13. The system of claim 1, wherein the irradiation region further comprises at least one screen having openings larger than an average grain diameter, wherein the at least one screen affects the flow rate of the grain foods, wherein a number of openings in the screen is configured to prevent the flow rate from stopping.

14. The system of claim 13, wherein the screen contains a second set of UV emitters.

15. The system of claim 13, further comprising means for vibrating the screen to deliver grain angular and linear momentum.

16. The system of claim 1, wherein the irradiation region further includes an active grain mixing element, wherein the active grain mixing element provides at least one of: vibrational mixing or rotational mixing.

17. A system for irradiation of grain foods, the system comprising:

an ultraviolet irradiation region for exposing the grain foods to ultraviolet light, with the irradiation region having a set of UV emitters positioned to irradiate the grain foods as the grain foods pass through the irradiation region;

means for moving the grain foods through the irradiation region;

means for detecting a flow rate of the grain foods moving through the irradiation region;

an auxiliary light emitting source for testing grain fluorescence;

a fluorescence sensor for detecting a fluorescent signal from the grain foods irradiated by the auxiliary light emitting source; and a control system for adjusting power provided to the set of UV emitters based on the flow rate of the grain foods moving through the irradiation system and an intensity of the fluorescent signal measured by the fluorescence sensor.

18. The system of claim 17, wherein the control system adjusts and optimizes a UV exposure regime for the grain foods based on a set of target grain fluorescence characteristics.

19. The system of claim 17, further comprising means for disinfection of the grain food using at least one of: a chemical or a gas.

20. The system of claim 17, wherein the set of UV emitters includes at least two UV emitters with peak wavelengths that differ by at least 10 nm.

* * * * *